R. HAMILTON.
Evaporating Pan.

No. 37,751.

Patented Feb. 24, 1863.

Witnesses:

Inventor:

UNITED STATES PATENT OFFICE.

ROBERT HAMILTON, OF FRANKLIN, INDIANA.

IMPROVED SUGAR-EVAPORATOR.

Specification forming part of Letters Patent No. 37,751, dated February 24, 1863.

*To all whom it may concern:*

Be it known that I, ROBT. HAMILTON, of Franklin, Johnson county, Indiana, have invented a new and useful Saccharine Evaporator, of which the following is a full, clear, and exact description, reference being had to the annexed drawings, making part of this specification.

The object of my invention is a provision for the inspissation of saccharine fluids, and is particularly designed for the juice of sorghum and imphee sugar-canes.

Figure 1:
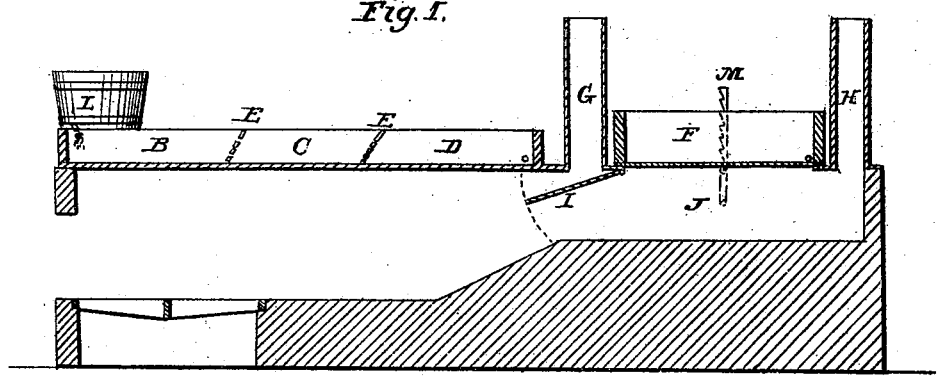
Figure 2:
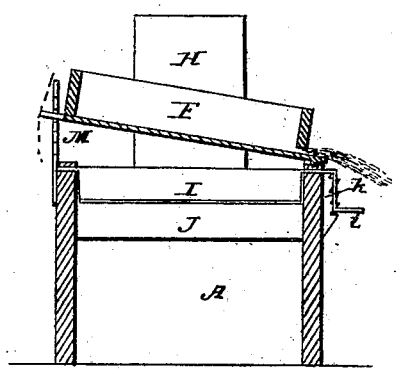

Figure 1 is a longitudinal section, and Fig. 2 is a transverse section, of a battery or boiling apparatus embodying my improvement.

A represents a furnace adapted to carry a series of evaporating-pans, B, C, D, (separated by wire-gauze or perforated partitions or screens E,) and a final boiling-pan, F.

Two chimneys, G and H, carry off the smoke from my furnace, one chimney, G, being situated at front of the pan F and the other to the rear of said pan.

A damper, I, hinged near the furnace-crown, and extending athwart the flue between the chimney G and the final boiling-pan, enables the operator to either close the intermediate chimney, G, so as to admit the full body of flame to the pan F, or to close the portion J of the flue immediately under the pan F, and at the same time to open the intermediate chimney, G; or by setting the damper at any intermediate position a greater or less portion of heat may be conducted to the bottom of the pan F. In order to enable these adjustments to be maintained I provide a rack, K, in which the handle *i* of damper I may be engaged.

The screens E serve to pass the pure juice and retain the scum and feculences.

L represents a tub or other receptacle to hold the crude sap for delivery, when desired, into the first pan B.

The final boiler F may be removable, and may be hinged, as shown, to the furnace, so as to be capable of being canted to the position shown in Fig. 2, or any other inclination that may be desired, either for discharging or simply cooling the contents of the pan.

M is a rack for sustaining the pan at any angle.

I claim herein as new and of my invention—

1. The arrangement of first and final boiling-pans B, C, D, and F, chimneys G and H, and damper I, substantially as and for the purposes set forth.

2. The described arrangement of hinged and removable final boiling-pan F and supporting-rack M.

In testimony of which invention I hereunto set my hand.

ROBERT HAMILTON.

Witnesses:
 A. B. HUNTER,
 G. M. OVERSTREET.